April 25, 1961 A. W. GAULKE ET AL 2,981,407
CONTOUR CARTON FOR WRAPAROUND WINDSHIELDS
Filed Feb. 27, 1959 4 Sheets-Sheet 1
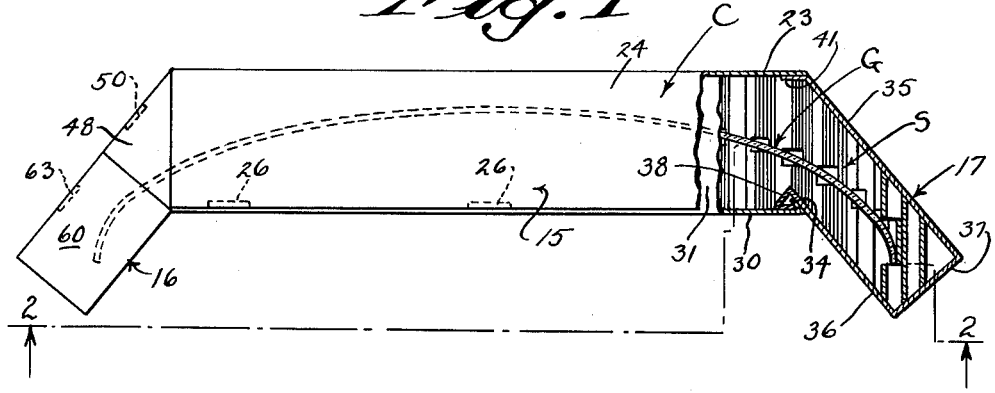
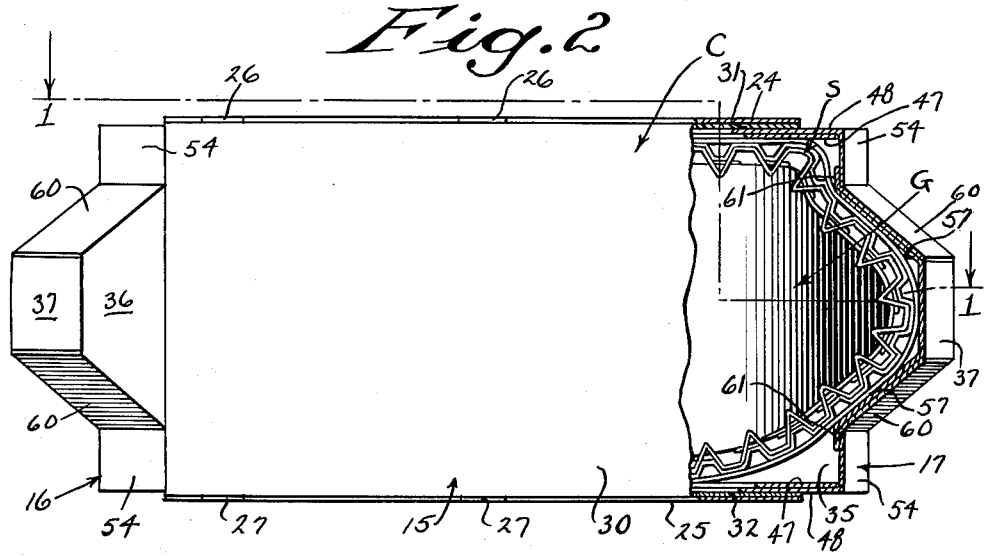
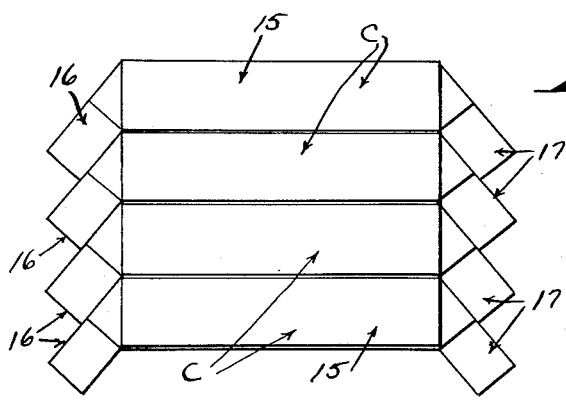
INVENTORS
ARTHUR W. GAULKE
CHARLES R. HUTCHINSON
BY
*Wright and Wright*
ATTORNEYS April 25, 1961    A. W. GAULKE ET AL    2,981,407
CONTOUR CARTON FOR WRAPAROUND WINDSHIELDS
Filed Feb. 27, 1959    4 Sheets-Sheet 2
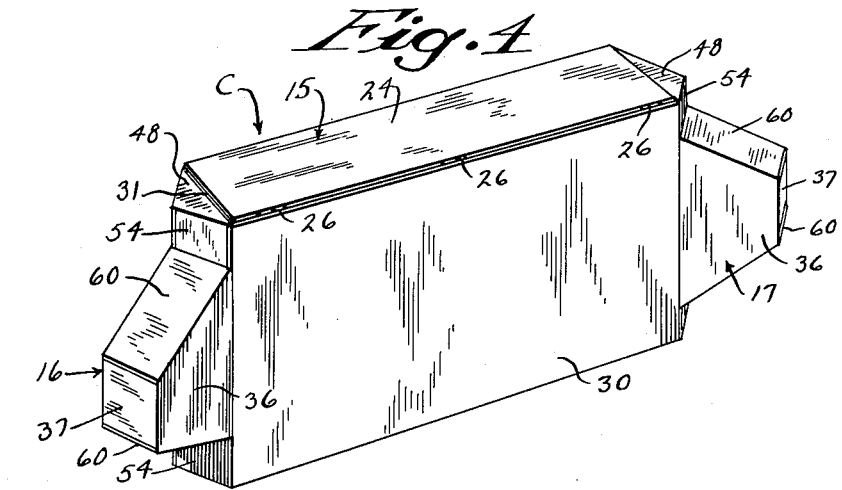
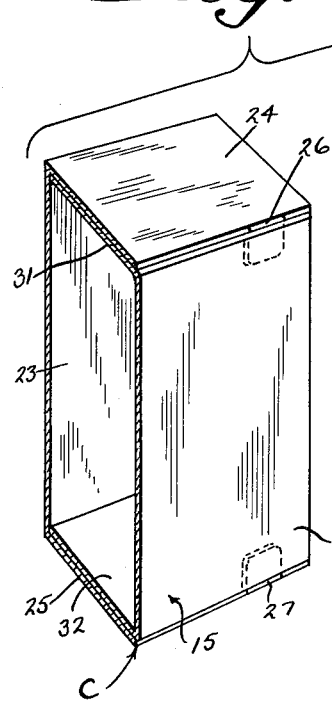
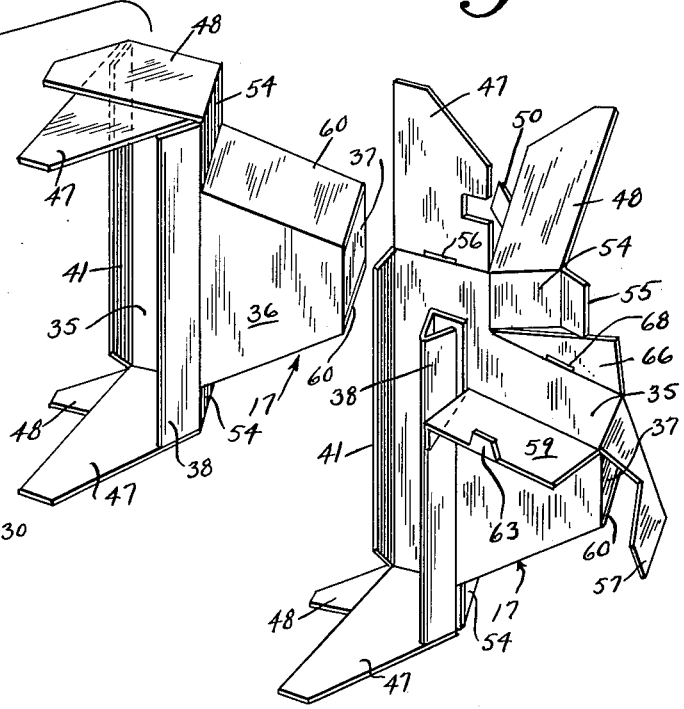
INVENTORS
ARTHUR W. GAULKE
CHARLES R. HUTCHINSON
BY Wright & Wright
ATTORNEYS April 25, 1961   A. W. GAULKE ET AL   2,981,407
CONTOUR CARTON FOR WRAPAROUND WINDSHIELDS
Filed Feb. 27, 1959   4 Sheets-Sheet 3

INVENTORS
ARTHUR W. GAULKE
CHARLES R. HUTCHINSON

BY
Wright and Wright
ATTORNEYS

INVENTORS
ARTHUR W. GAULKE
CHARLES R. HUTCHINSON

BY

*Wright and Wright*

ATTORNEYS

United States Patent Office 2,981,407
Patented Apr. 25, 1961

2,981,407

CONTOUR CARTON FOR WRAPAROUND WINDSHIELDS

Arthur W. Gaulke and Charles R. Hutchinson, Milwaukee, Wis., assignors to Vanant Company, Inc., Milwaukee, Wis., a corporation of Wisconsin Filed Feb. 27, 1959, Ser. No. 795,973

8 Claims. (Cl. 206—62)

This invention appertains to shipping cartons for curved automobile glass and is a further step forward in the art over co-pending application for patent executed November 25, 1958, filed on even date herewith and given Serial No. 795,961 entitled "Carton for Panoramic Automobile Glass."

One of the primary objects of the present invention is to provide a novel means for forming and closing the oppositely extending, outwardly inclined wings for receiving the curved terminals of the automobile glass and for associating the wings with the central body portion of the carton to form a strong, durable carton, which closely follows the contour of the glass and permits effective nesting of a plurality of cartons during shipping and storing.

Another salient object of the invention is to provide means for forming the inclined wings of the carton separate from the body portion of the carton, whereby the blanks for the wings can be readily made and whereby the wings are more closely conformed to the curved terminals of the glass and provide the desired protection therefor.

A further object of the invention is to provide novel means for associating and securing the wings to the body portion, whereby the entire carton will be effectively braced and reinforced to provide the desired rugged structure.

Another further object of the invention is the provision for forming integral reinforcing posts on the wings extending into the body portion of the carton and the entire height thereof so that upon securing the wings in place on the body portion, the carton will be enabled to withstand great crushing strains.

A still further object of the invention is the provision of novel interlocking flaps on the wing blanks, which can be readily folded one on top of the other to form the desired rigid, rugged wing structure.

With these and other objects in view, the invention consists in the novel construction, arrangement and formation of parts, as will be hereinafter more specifically described and claimed, and illustrated in the accompanying drawings, in which drawings, Figure 1 is a top plan view of the improved shipping carton, parts of the figure being shown broken away and in section to illustrate structural detail and to show the position of the curved glass in the carton, the parts of the figure shown in section being taken on the line 1—1 of Figure 2, looking in the direction of the arrows;

Figure 2 is a rear elevational view of the improved carton, parts of the carton being shown broken away and in section to illustrate details of construction and the position of the curved terminals of the glass in the inclined wings, the parts of the figure shown in section being taken on the line 2—2 of Figure 1, looking in the direction of the arrows;

Figure 3 is a top plan view showing a plurality of the improved cartons in their nested position, the view being taken on a smaller scale than Figures 1 and 2;

Figure 4 is a perspective view of the carton in its completely closed position;

Figure 5 is an exploded view with the one wing in its folded position removed from the body portion of the carton, only a fragment of one end of the body of the carton being shown;

Figure 6 is a detail perspective view of one of the end inclined wings of the carton, the bottom flaps of the wing being shown in their folded connected positions and the top flaps being shown in their completely open position;

Figure 7:
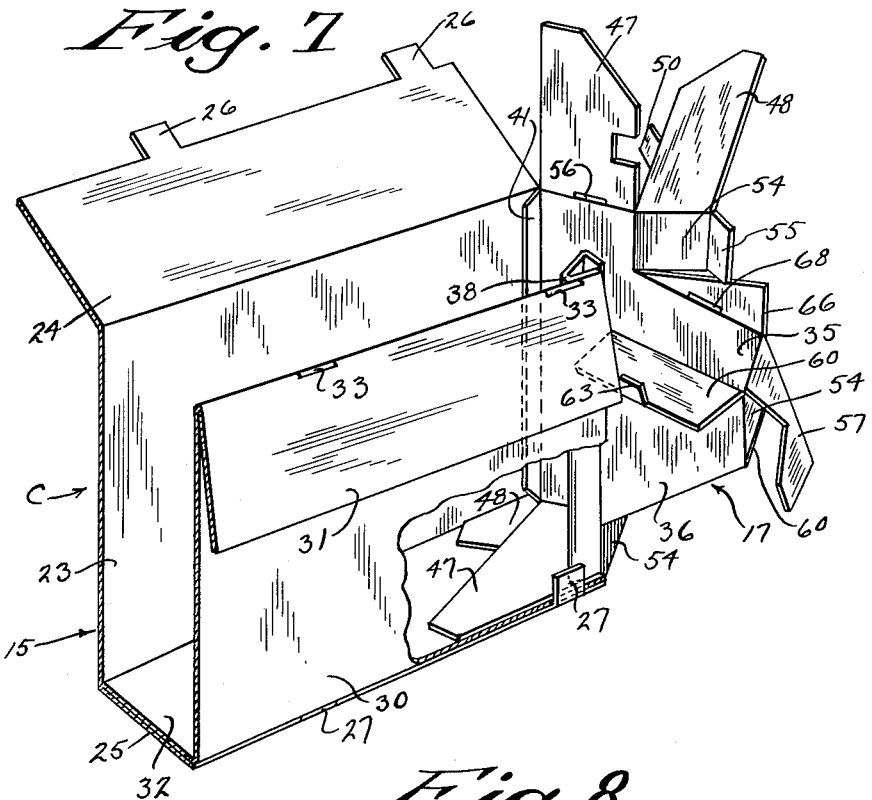
Figure 7 is a fragmentary perspective view showing one end of the carton with one wing inserted in the carton and partially glued thereto with the top flaps in their open position.

Referring to the drawings in detail, wherein similar reference characters designate corresponding parts throughout the several views, the letter C generally indicates our improved carton and the same includes a main straight body portion 15 and outwardly extending oppositely inclined wings 16 and 17. Each wing 16 and 17 is of identical construction and the wings initially are formed separate from the body portion 15 and each wing is formed from a blank 18, best shown in Figure 12.

Figure 10:
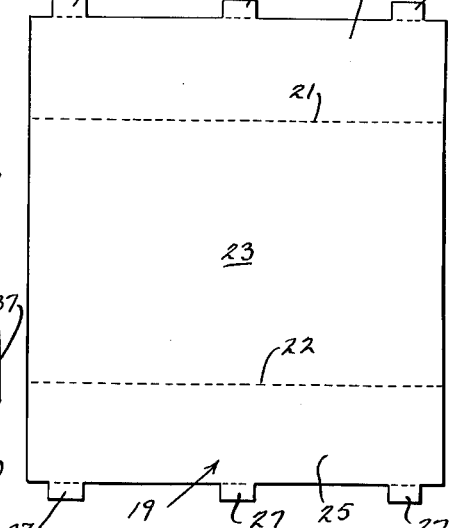
Figure 10 is a top plan view of one blank for the body portion of the carton.
Figure 11:
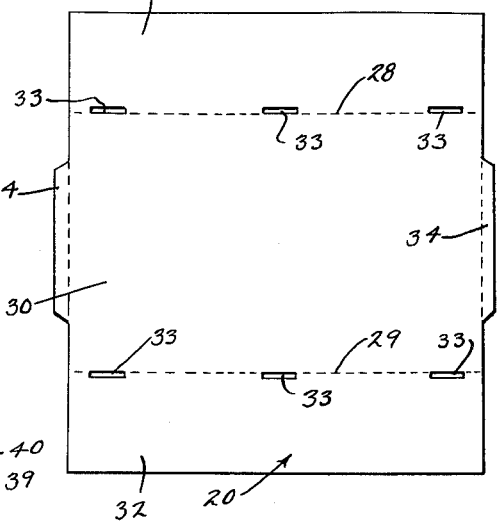
Figure 11 is a top plan view of the blank for the other part of the body portion of the carton.

The straight body portion 15 can be formed in various manners and can be folded from a single blank of sheet material. In the present form, however, we prefer to construct the body 15 from independent blanks 19 and 20, as shown in Figures 10 and 11. The blank 19 is scored or otherwise weakened along spaced longitudinally extending lines 21 and 22 to define a side wall 23 and top and bottom closure flaps 24 and 25. The outer edge of the top wall closure flap 24 is provided with locking tongues 26. The bottom closure wall 25 has its outer edge provided with similar closure or locking tongues 27.

The blank 20 for the other portion of the body is also scored or otherwise weakened along spaced longitudinal lines 28 and 29 to define a rear wall 30 and like top and bottom closure flaps 31 and 32. This blank is provided at spaced points along the score lines 28 and 29 with slots 33 for receiving the tongues 26 and 27, as will later appear. The ends of the rear side wall 30 have formed thereon bendable gluing tabs 34.

Figure 8:
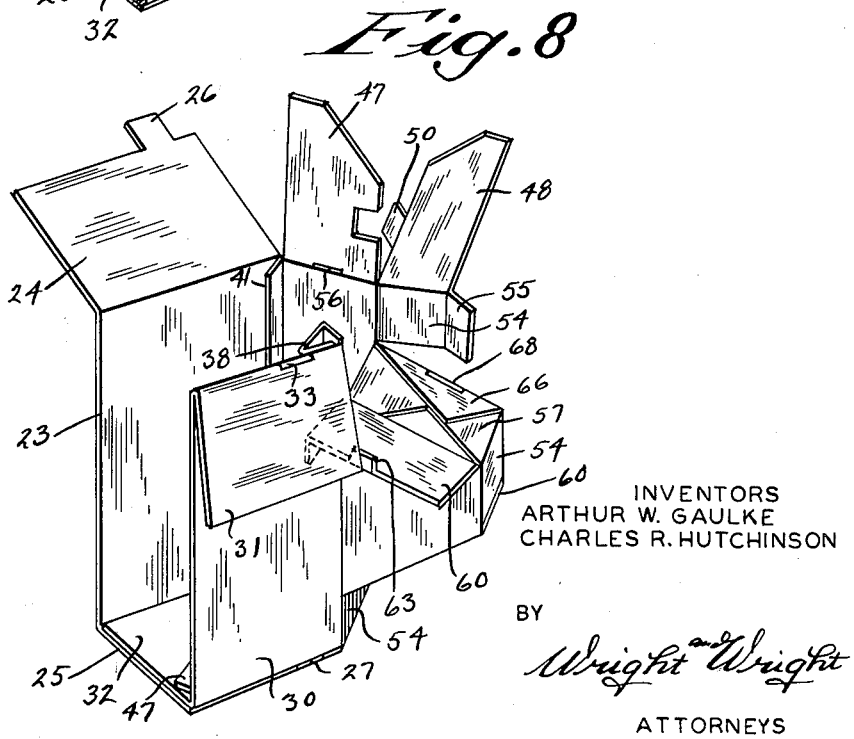
Figure 8 is a view similar to Figure 7, but showing certain of the flaps in their folded position.
Figure 9:
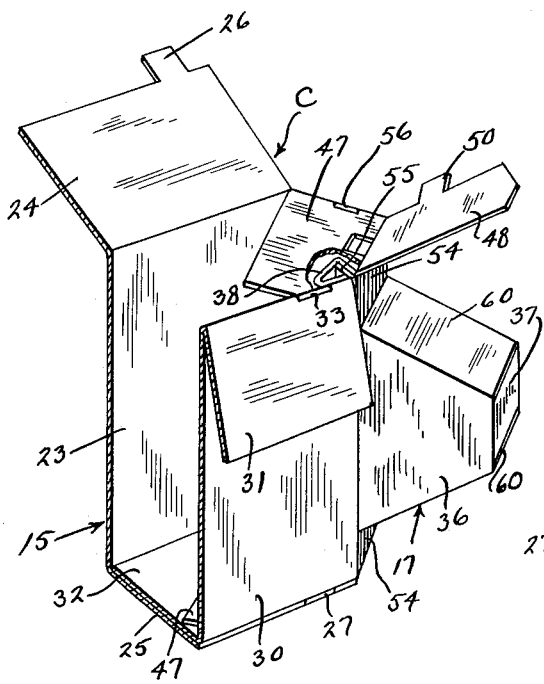
Figure 9 is a view similar to Figure 8, but showing additional flaps in their folded glued position, the automobile glass in Figures 7 and 8 and 9 being omitted for the sake of clearness.

In forming the body portion, the flaps 24 and 25 of the blank 19 and the flaps 31 and 32 of the blank 20 are folded on their score lines and initially the bottom wall flaps 25 and 32 are placed one upon the other and secured rigidly together by glue or staples and the tabs 27 are bent up and inserted through end slots 33. The walls 23 and 30 are now in an upright vertical position, and the top wall flaps 24 and 31 are left open, as shown in Figures 7, 8 and 9. At this time, the gluing tabs 34 can be bent inwardly, as best shown in Figure 1. The body portion is now ready to receive the end wings 16 and 17, and the bottoms of the end wings are folded and glued together and secured to the body portion, leaving the various top wall flaps of the wings open to permit the placing of the curved glass G in the carton, the glass being shown in Figures 1 and 2.

It is to be also understood at this time, that the glass has its peripheral edge wrapped and encircled by a cushioning packaging strip S. The packaging strip S can be of the type shown in Patent No. 2,776,745 issued January 8, 1957.

Figure 12:
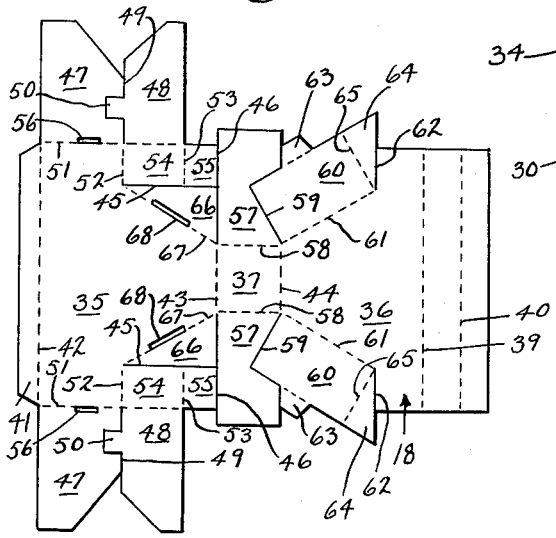
Figure 12 is a top plan view of the blank at one end wing of the carton.

The blank 18 for an end wing is cut and scored as shown in Figure 12, to provide front and rear sidewalls 35 and 36 and a connecting end wall 37. The vertical edge of the rear side wall 36 has formed thereon a folded reinforcing post 38. The blank is scored along spaced longitudinal lines 39 and 40 adjacent to the vertical edge of the side wall 36 and the blank is folded back on itself on the score lines to form the post. The post is best shown in Figures 1 and 6. The vertical edge of the front side wall 35 has formed thereon a gluing tab 41 and this tab can be bent at substantially right angles to its wall 35 on a score line 42 formed in the blank. The side walls 35 and 36 and end wall 37 are defined by spaced longitudinal score lines 43 and 44, and it is to be noted that these score lines are at the central portion of the blank and do not extend to the top and bottom edges of the blank and hence the end wall 37 is of a much smaller size and area than the side walls 35 and 36. With the blank folded on the score lines 43 and 44 with the walls 35 and 36 in spaced parallel relation, the folded post 38 and the glue tab 41 can be inserted in the end of the body portion of the carton and one face of the post and one face of the tab 41 is firmly secured by an adhesive or staples to the inner faces of the front and rear side walls 23 and 30, respectively. At the time of the securing of the post 38 to the wall 30, the gluing tab 34 carried by the wall 30 is bent inwardly and is secured by an adhesive to that portion of the wall 36 which extends into the body portion 15 of the carton.

To form the top and bottom of the wing, the blank is cut and scored to provide identical sealing flaps at the top and bottom of the blank 18, and hence the top wall sealing flaps for only one wing will be described in detail. The top and bottom walls of the end wings, however, are formed by the sealing flaps and certain walls of the wings carry sealing flaps which extend into the body portion of the carton to reinforce the same, at its top and bottom and to provide an adequate means for rigidly securing the end wings in place. At this time, it is to be noted that the outer side wall wing 35 is of a much greater length than the inner side wall 36, so that the desired inclination of the wings from the body will be had. The primary portions of the wings are of a less height than the height of the body portion of the carton, so that the wings will effectively receive and house the tapered curved end portions of the glass G. This makes it necessary to provide additional closures for the ends of the body of the carton, at the top and bottom of the wing. Hence, the outer wall 35 adjacent to its upper and lower edges is provided with right angularly extending cuts 45 and 46 and the top and lower edges of the wall 35 are extended to provide inwardly extending sealing flaps 47 and 48, which when folded one on top of the other extend into the body portion of the carton, as best shown in Figures 5 and 9. The slits 45 and 46 define a part of the flap 48 and the flaps 47 and 48 are divided by a slit 49 which extends to the edge of the wall 35. The slit 49 is shaped to provide a locking tongue 50 on one edge of the flap 48. The flap 47 is folded on its edge of the wall 35 along a score line 51 and this score line is extended along the flap 48. Due to the slits 45 and 46, the flap 48 is connected at one vertical edge to the wall 35 and is folded on the wall along a vertically extending score line 52 which extends from the cut 49 to the cut 45. A score line 53 is made parallel to the score line 52 and this score line 53 extends from one edge of the flap 48 to the cut 45. The slit 45 and the score lines 51, 52 and 53 define a short end wall 54 for closing the body of the carton at the point of the juncture of the tapered main body portion of the wing with the body portion of the carton, and this wall 54 is bent on the score line 52 at substantially right angles to the wall 35. The slits 45 and 46 and score line 53 define a glue tab 55, which is bent at right angles to the wall 54 and is inserted into the carton and securely glued to the inner face of the post 38 or extension of wall 36 above and below the glue tab 34.

From the description so far, it can be seen that the wall 34 and the short end wall 54 carry respectively elongated closure flaps 47 and 48 and that these flaps are of such a length as to extend into the body portion of the carton when the flaps are in their folded overlapping position. At the point of flap 47 juncture with the side wall 35, a slit 56 is provided midway between the score line 51 and the locking tongue 50 is bent at right angles on its flap 48 and inserted into this slit 56. The upper and lower edges of the extreme end wall 37 at the terminal of the tapered wing, has formed thereon inwardly foldable sealing flaps 57 and these flaps are folded along transversely extending score lines 58 and these score lines 58 extend between the score lines 43 and 44. The flaps 57 are further made by the cuts 46 and by additional cuts 59. Formed on the edges of the wall 36 are sealing flaps 60 and these flaps are defined by diagonally extending score lines 61 which extend from the points of juncture of the score lines 58 and 44. The blank is also provided with cuts 62 which lead outwardly from the diagonal score lines 61 to the edges of the wall 36 and these cuts 62 further define the flaps 60. The flaps 60 have formed on their outer edges locking tongues 63 and the side edges of the flaps 60 remote from the cuts 59 have formed thereon flap gluing tabs or wings 64. These wings are folded on score lines 65 extending transversely of the flaps 60. Additional sealing flaps 66 of a triangular shape are formed on the upper and lower edges of the wall 35 and these triangular shaped sealing flaps 66 are defined by the cuts 45 and 46 and by diagonally extending score lines 67 which extend from the score lines 52 to the inner ends of the cuts 46. At the juncture of the flap 66 with the wall 35, slots 68 are provided for receiving the tongues 63, as will be later more fully set forth. These cuts 68 are formed midway of the score lines 67.

As heretofore stated, the tops and bottoms of the wings are identical in formation, and considering for the moment that the wings have been set up with their bottoms folded and connected to the body portion of the carton—the carton will then be in the position shown in Figure 7. The glass G with its packing strip is inserted in the carton, after which the tops of the wings are folded and sealed. This will now be described, and again, the bottom of the wing is folded in identically the same manner as the top of the wing, and as now described.

The flap 57 is folded inwardly to a lowered position over the glass G and the strip S, after which the flap 66 is folded inwardly and secured to the upper surface of the flap 57 by suitable adhesive. This is shown in Figure 8. The next step is the folding down of flap 59 over flap 66 with the tongue 63 inserted in its slot 68 and the flap can be further secured in position by a suitable adhesive. This completes the tapered portion of the wing. The wall 54 can now be folded inwardly over the over-lapping flaps 57, 66 and 59 and the glue tab 55 can be adhesively secured in position, as previously set forth. This completes the end of the wing. The flap 47 can now be folded down on top of the glass G and its strip 47, and can be secured if such should be desired by an adhesive to the top of the post 38. The flap 48 is now folded down over the flap 47 and the tongue 50 is inserted in the slot 56. These flaps, if such should be desired, can be adhesively secured together. The flaps 47 and 48 extend across one another and again are of such a length as to project into the ends of the body portion of the carton. This completes the folding of an end wing and after the folding of an end wing, the flap 31 of the body portion is folded inwardly over the glass, after which the flap 24 of the body portion is folded over the flap 36 and secured adhesively thereto, if such is desired. The locking tongues 26, however, are inserted in the slots 33.

The carton is now complete and is ready for shipping or storing.

The carton itself is of such a construction that a plurality of the cartons can be closely nested together in a compact form, as shown in Figure 3, and this is brought about due to the fact that the front side wall 23 of the body portion of the carton is of a less length or a length equal to the inner side wall 30.

Great stress is laid on the formation of the tapered wings and the fact that the wings include overlapping flaps which extend a material distance into the body portion of a carton. This permits the firm securing of the wings in place and the overlapping flaps add rigidity to the carton. Great stress is also laid on the fact that a securing tab 41 and a supporting post 38 are formed on the ends of the wings, and that these portions extend into the body part 15 of the carton. The tab 41 and post 38 not only add strength and rigidity to the carton, but also provide an ideal means for securing the wings in place, and the wings are secured to the body portion of the carton on all of its four sides.

Changes in details may be made without departing from the spirit or the scope of this invention, but what we claim as new is:

1. A carton for shipping and storing curved automobile glass of the type including a central portion and curved back diverging terminals, comprising a straight body portion and laterally extending diverging wings defining a carton of a substantially U-shape in plan, the body portion and wings being formed from independent blanks, the wing blanks having inwardly extending securing tabs on their inner ends extending into the terminals of the straight body portion and secured thereto, at least one of said tabs being folded back on itself to form a supporting post.

2. A carton for the shipping and storing of curved automobile glass of the type including a central portion and curved back diverging terminals, comprising a straight body portion and laterally extending diverging wings defining a carton of a substantially U-shape in plan, the body portion and wings being formed from independent blanks, the wing blanks having formed thereon on their side edges inwardly extending securing tabs inserted in the terminals of the body portion and secured thereto, said wings also including side walls and top and bottom closure flaps, certain of said flaps extending into the body portion and engaging the top and bottom of the body portion.

3. A carton for the shipping and storing of curved automobile glass of the type including a central curved portion and curved back diverging tapering terminals, comprising a straight body portion and laterally extending diverging wings defining a carton of a substantially U-shape in plan, the body portion and wings being formed from independent blanks, said body portion including spaced side walls and top and bottom closure flaps, each of said wings including side walls, end walls and top and bottom overlapping closure flaps, inwardly extending securing tabs formed on the vertical edges of the side walls of the wings inserted in the body portion and secured to the side walls thereof, and certain of the top and bottom closure flaps extending into the body portion and engaging the top and bottom wall closure flaps thereof.

4. A carton for the shipping and storing of curved automobile glass as defined in claim 3, and at least one of said securing tabs being folded back upon itself to form a supporting post extending the full height of the body portion.

5. A carton for the shipping and storing of curved automobile glass as defined in claim 3, and means for interlocking certain of the top and bottom wing flaps together.

6. A carton for the shipping and storing of curved automobile glass of the type including a central portion and curved back diverging tapered terminals, comprising a straight body portion and laterally extending diverging wings defining a carton of substantially U-shape in plan, the body portion and wings being formed from independent blanks, the ends of the body portion being open for receiving inner portions of the wings, said body portion including side walls and top and bottom closure flaps, said wings including tapering spaced side walls and connecting outer walls, securing tabs formed on the inner edges of the side walls inserted in the ends of the body portion and secured to the side walls thereof, said side walls also having formed thereon folded end wall members arranged above and below the tapered portions of the side walls, closure flaps on certain side walls and on the outer edges of the end wall portions arranged in overlapping relation and interlocked together extending into the body portion and engaging the top and bottom wall closure flaps thereof, and said tapering side wall portions having top and bottom overlapping interlocking closure flaps.

7. A carton for the shipping and storing of curved automobile glass of the type including a central portion and curved back tapered diverging terminals, comprising a straight body portion and laterally extending diverging wings defining a carton of a substantially U-shape in plan, said body portion and wings being formed from independent blanks, said body portion including spaced side walls and top and bottom closure flaps, the body portion being normally open for receiving portions of the wings, each of said wings including side walls and a connecting end wall, said side walls having inner portions substantially equal to the height of the side walls of the body and outwardly tapered portions, one of the inner side wall portions having formed thereon folded end wall members disposed above and below the tapered portions of the side walls, overlapping interlocking flaps formed on the end wall portions and certain side walls extending into the ends of the body portion and engaging the top and bottom wall flaps thereof, and overlapping interlocking top and bottom closure flaps on the tapered side wall portions of the wings.

8. A carton for the shipping and storing of curved automobile glass as defined in claim 7, and securing tabs on the inner ends of the inner side wall portions extending into the body portion of the carton and secured to the side walls thereof, at least one of said tabs being folded back upon itself to form supporting posts, the posts extending from the bottom to the top of the body portion of the carton.

References Cited in the file of this patent
UNITED STATES PATENTS

| | | |
|---|---|---|
| 1,867,374 | Myers | July 12, 1932 |
| 2,118,821 | Ringler | May 31, 1938 |